US009467006B2

(12) United States Patent
Dickerson et al.

(10) Patent No.: US 9,467,006 B2
(45) Date of Patent: Oct. 11, 2016

(54) AUTOMATIC TRANSFER SWITCH FOR THREE-PHASE APPLICATIONS

(71) Applicant: Trippe Manufacturing Company, Chicago, IL (US)

(72) Inventors: Paul Dickerson, Hinsdale, IL (US); Salim Ling, Buffalo Grove, IL (US); Shawn Lord, Bolingbrook, IL (US)

(73) Assignee: TRIPPE MANUFACTURING COMPANY, Chicago, IL (US)

( * ) Notice: Subject to any disclaimer, the term of this patent is extended or adjusted under 35 U.S.C. 154(b) by 441 days.

(21) Appl. No.: 14/177,425

(22) Filed: Feb. 11, 2014

(65) Prior Publication Data

US 2015/0084420 A1  Mar. 26, 2015

Related U.S. Application Data

(60) Provisional application No. 61/881,311, filed on Sep. 23, 2013.

(51) Int. Cl.
 *H02J 1/10* (2006.01)
 *H02J 9/06* (2006.01)
(52) U.S. Cl.
 CPC ............ *H02J 9/06* (2013.01); *Y10T 307/391* (2015.04); *Y10T 307/696* (2015.04)
(58) Field of Classification Search
 CPC ... Y10T 307/391; Y10T 307/696; H02J 9/06
 USPC .......................................................... 307/29
 See application file for complete search history.

(56) References Cited

U.S. PATENT DOCUMENTS

| 3,936,782 A | 2/1976 | Moakler et al. |
| 4,021,678 A | 5/1977 | Moakler et al. |
| 4,157,461 A | 6/1979 | Wiktor |
| 4,189,649 A | 2/1980 | Przywozny et al. |
| 4,398,097 A | 8/1983 | Schell et al. |
| 4,423,336 A | 12/1983 | Iverson et al. |
| 4,672,227 A | 6/1987 | Lagree et al. |
| 4,747,061 A | 5/1988 | Lagree et al. |
| 4,804,933 A | 2/1989 | Becker et al. |

(Continued)

FOREIGN PATENT DOCUMENTS

WO  2012021759  2/2012

*Primary Examiner* — Jared Fureman
*Assistant Examiner* — Duc M Pham
(74) *Attorney, Agent, or Firm* — Michael Best & Friedrich LLP (57) ABSTRACT

A three phase to single phase automatic transfer switch for providing power to at least one single phase power load from one of a primary and a secondary source of three phase power. The automatic transfer switch includes three pairs of switches, wherein each pair of switches is connectable to the primary and the secondary sources of three phase power, wherein each switch operates in unison with the other switch within its pair, wherein each pair of switches is connectable to a different one of the at least one single phase power load, and wherein each pair of switches is operable independently of the other pairs of switches. The three phase to single phase automatic transfer switch also includes one or more controller in communication with each of the pairs of switches, the controller configured so that, when power from the primary source of three phase power is lost or degraded, the controller connects each pair of switches independently of each of the other pairs of switches from the primary to the secondary source of three phase power.

17 Claims, 9 Drawing Sheets

(56) References Cited

U.S. PATENT DOCUMENTS

| | | | |
|---|---|---|---|
| 4,894,796 A | 1/1990 | Engel et al. | |
| 5,023,469 A | 6/1991 | Bassett et al. | |
| 5,070,252 A | 12/1991 | Castenschiold et al. | |
| 5,748,432 A | 5/1998 | Przywozny et al. | |
| 5,914,467 A | 6/1999 | Jonas et al. | |
| 5,939,799 A | 8/1999 | Weinstein | |
| 6,100,604 A | 8/2000 | Morroni et al. | |
| 6,172,432 B1 | 1/2001 | Schnackenberg et al. | |
| 6,184,593 B1 * | 2/2001 | Jungreis | H02J 9/062 307/64 |
| 6,593,670 B2 | 7/2003 | Anderson | |
| 6,604,277 B2 | 8/2003 | Schultz et al. | |
| 6,628,009 B1 | 9/2003 | Chapel | |
| 6,731,484 B2 | 5/2004 | Pebles et al. | |
| 6,825,578 B2 | 11/2004 | Perttu | |
| 6,849,967 B2 | 2/2005 | Lathrop et al. | |
| 6,876,103 B2 | 4/2005 | Radusewicz et al. | |
| 6,879,060 B2 | 4/2005 | Hohri | |
| 6,944,002 B2 | 9/2005 | Serrano et al. | |
| 6,980,911 B2 | 12/2005 | Eaton et al. | |
| 7,005,760 B2 | 2/2006 | Eaton et al. | |
| 7,157,811 B2 | 1/2007 | Eaton et al. | |
| 7,259,481 B2 | 8/2007 | Eaton et al. | |
| 7,362,696 B2 | 4/2008 | Ferry et al. | |
| 7,435,920 B1 | 10/2008 | Yoo | |
| 7,468,566 B2 | 12/2008 | Serrano et al. | |
| 7,762,786 B2 | 7/2010 | Taylor et al. | |
| 7,868,484 B2 | 1/2011 | Groff et al. | |
| 7,898,372 B2 | 3/2011 | Melchionne, Jr. | |
| 7,973,253 B2 | 7/2011 | Gibbs et al. | |
| 8,004,115 B2 | 8/2011 | Chapel et al. | |
| 8,022,579 B2 | 9/2011 | Groff et al. | |
| 8,138,625 B2 | 3/2012 | Duan et al. | |
| 8,138,634 B2 | 3/2012 | Ewing et al. | |
| 8,138,861 B2 | 3/2012 | Krieger et al. | |
| 8,222,548 B2 | 7/2012 | Espeut, Jr. | |
| 8,431,846 B2 | 4/2013 | Lyu | |
| 8,471,659 B1 | 6/2013 | Flegel | |
| 2002/0084697 A1 * | 7/2002 | Radusewicz | H02J 9/06 307/64 |
| 2006/0028069 A1 * | 2/2006 | Loucks | H02J 3/005 307/130 |
| 2010/0033274 A1 | 2/2010 | Groff et al. | |
| 2010/0033275 A1 | 2/2010 | Groff et al. | |
| 2010/0038966 A1 | 2/2010 | Espeut, Jr. | |
| 2010/0140061 A1 | 6/2010 | Gibbs et al. | |
| 2010/0141038 A1 | 6/2010 | Chapel et al. | |
| 2010/0141047 A1 | 6/2010 | Gibbs et al. | |
| 2010/0288610 A1 | 11/2010 | Krieger et al. | |
| 2011/0036695 A1 | 2/2011 | Lyu | |
| 2011/0068625 A1 * | 3/2011 | Duan | G06F 11/2015 307/29 |
| 2012/0090966 A1 | 4/2012 | Lathrop | |
| 2012/0104848 A1 | 5/2012 | Lathrop et al. | |
| 2012/0181869 A1 | 7/2012 | Chapel et al. | |
| 2012/0242145 A1 | 9/2012 | Espeut, Jr. | |
| 2012/0299381 A1 | 11/2012 | Larson | |
| 2013/0015004 A1 | 1/2013 | Simons | |
| 2013/0049476 A1 | 2/2013 | Lathrop | |
| 2013/0140904 A1 | 6/2013 | Flegel | |
| 2013/0188298 A1 | 7/2013 | Srikantaiah et al. | |
| 2013/0214605 A1 | 8/2013 | Evans et al. | |

* cited by examiner

Figure 1

PRIOR ART

Figure 2

PRIOR ART

AUTOMATIC TRANSFER SWITCH FOR THREE-PHASE APPLICATIONS

CROSS-REFERENCE TO RELATED APPLICATIONS

This application claims priority to U.S. Provisional Patent Application No. 61/881,311 filed Sep. 23, 2013, the content of which is incorporated herein by reference in its entirety.

BACKGROUND

The present invention relates to automatic transfer switches for three-phase power supplies.

In data centers, electrical and computer equipment (e.g., servers) is commonly mounted in racks. To achieve power redundancy, some data centers bring two sources of power to each server-filled rack, a primary power source and a secondary power source. Historically, these power sources have provided single phase (i.e. having two conductors) power. Automatic Transfer Switches (ATSs) are used in such dual-power systems to switch the power from the primary to the secondary source when the primary power source has degraded or is interrupted or lost. Under normal circumstances, the ATS connects all the servers in the rack to the primary power source. When the primary source is interrupted (i.e., a black out) or its quality has degraded (i.e., a brown out), the ATS switches the servers to the secondary power source. During the transition from the primary to the secondary power source, there is a brief period of time when the powered devices (e.g. servers) have no power, and that time is the "energy gap." Most devices can withstand a very short energy gap (e.g. about 10-20 milliseconds) which is longer than the period of time that it takes for a single-phase ATS to switch power sources (e.g. about 7-9 milliseconds).

Figure 1:
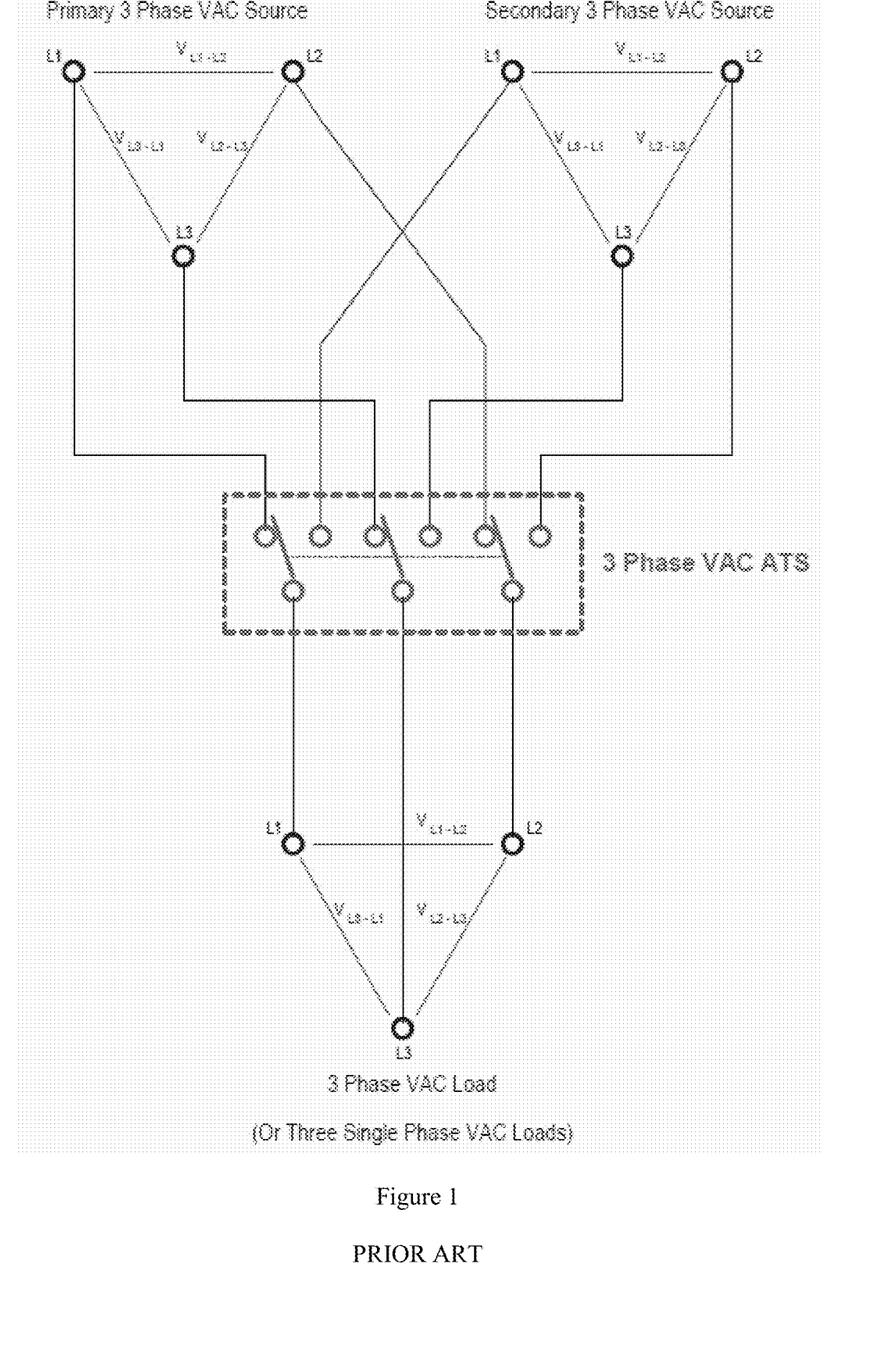
FIG. 1 shows a traditional three-phase to three-phase automatic transfer switch (ATS) for three-conductor three-phase power sources.
Figure 2:
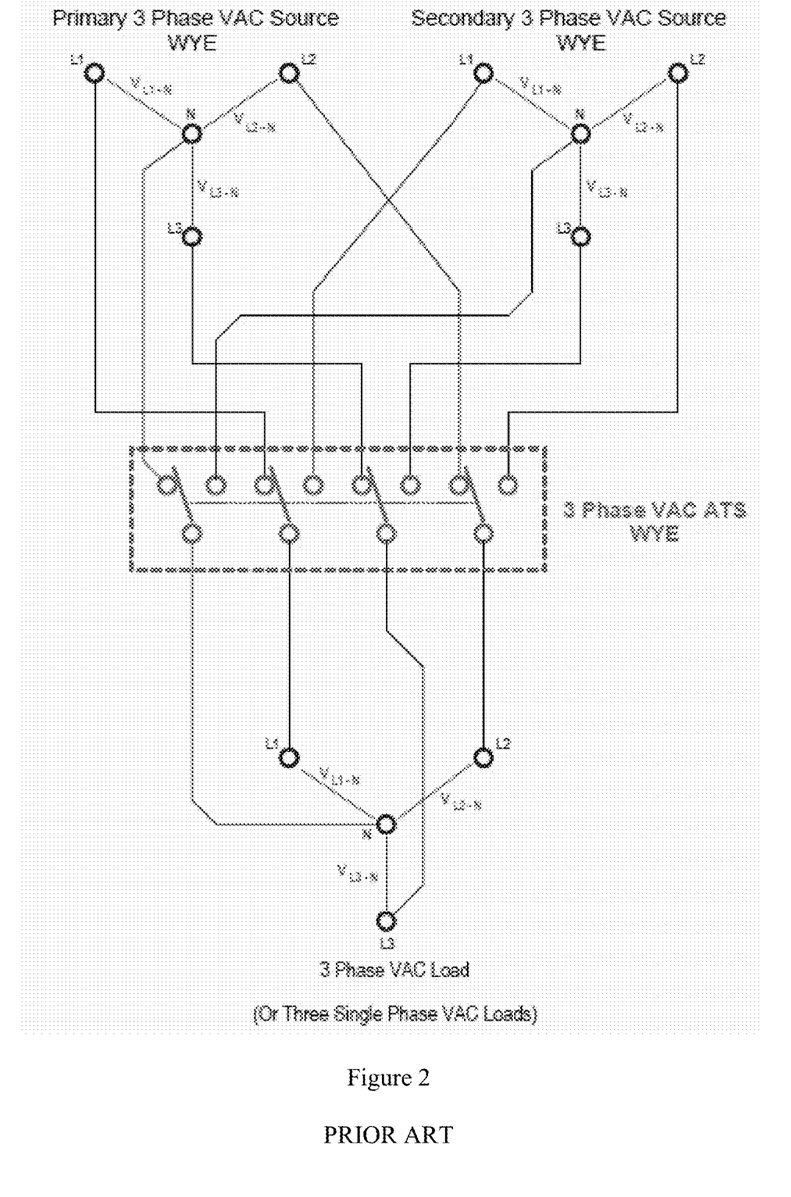
FIG. 2 shows a traditional three-phase to three-phase automatic transfer switch (ATS) for four-conductor three-phase power sources.

As the density of equipment in a single rack has increased, the amount of power required for a single rack's worth of equipment can exceed the amount that one single-phase power line can supply. Accordingly, three-phase power sources (i.e. having three or four conductors) are now being used to supply a single rack's worth of equipment. As with single-phase power sources, primary and secondary three-phase power sources are being used to provide redundancy along with three-phase ATS units (FIGS. 1, 2). However, three-phase ATSs require a longer period of time (about 16-20 milliseconds) than single-phase ATSs to switch from the primary to the secondary power source. As a result, many servers and other devices completely lose power during the transition, as described further hereafter. Complete loss of power, sometimes referred to as dropping of a load, causes equipment such as servers to abruptly shut down, leading to loss of data and computing capacity.

Thus, there is a need for an ATS for three-phase power sources that reduces the output energy gap of known three-phase ATSs. Other aspects of the invention will become apparent by consideration of the detailed description and accompanying drawings.

SUMMARY

In one embodiment, a three phase to single phase automatic transfer switch for providing power to at least one single phase power load from one of a primary and a secondary source of three phase power. The automatic transfer switch includes three pairs of switches, wherein each pair of switches is connectable to the primary and the secondary sources of three phase power, wherein each switch operates in unison with the other switch within its pair, wherein each pair of switches is connectable to a different one of the at least one single phase power load, and wherein each pair of switches is operable independently of the other pairs of switches. The three phase to single phase automatic transfer switch also includes a programmable controller in communication with each of the pairs of switches, the controller programmed so that, when power from the primary source of three phase power is lost or degraded, the controller connects each pair of switches independently of each of the other pairs of switches to the secondary source of three phase power.

In another embodiment, a three phase to single phase automatic transfer switch for providing power from one of two alternative three phase power sources to single phase power loads, each of the three phase power sources having at least three conductors. The automatic transfer switch includes three pairs of switches all connectable to either one of the two alternative three phase power sources, each switch operable in unison with the other switch within its pair, each pair of switches connectable to a different single phase load and operable independently of the other pairs of switches. Each of the switches has two input contacts and a toggle, the toggle normally connected to one of the input contacts, each input contact within a switch connectable to a conductor of one of the two alternative three phase power sources and the other input contact within a switch connectable to a conductor of the other of the two alternative three phase power sources and the toggle being connectable to at least one of the single phase power loads. The three phase to single phase automatic transfer switch also includes one or more controller communicating with the pairs of switches, the controller configured so that when power from a connected one of the two alternative three phase power sources is lost or degrades, the controller simultaneously flips the toggles in each switch pair from the connected to the previously unconnected contact independently of the other pairs of switches such that power is drawn from the other of the two alternative three phase power sources.

In yet another embodiment, a method of switching between a primary and a secondary three-phase power source, each of the primary and secondary three-phase power sources including at least three conductors. The method includes the steps of providing three pairs of switches, each pair of switches including a set of first contacts, a set of second contacts, and a set of toggles, wherein each of the toggles is normally connected to a first contact and is switchable between the first contact and a second contact; connecting the set of first contacts of each pair of switches to the primary three-phase power source; connecting the set of second contacts of each pair of switches to the secondary three-phase power source; connecting the set of toggles of at least one pair of the three pairs of switches to a single-phase load; and monitoring power on the conductors of the primary three-phase power source. The method also includes the step of, if the power on at least one of the conductors of the primary power source is lost or degraded, switching the set of toggles of at least one of the pairs of switches from the set of first contacts to the set of second contacts.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

With the density of servers in a given rack historically increasing, there has been a greater demand for power for a rack enclosure, particularly when the rack is filled with servers. Many data centers are using three-phase power, instead of single phase, to bring the necessary power to a rack.

Various embodiments of the presently-disclosed three-phase to single-phase ATS may be used in situations in which the power demands of a data center rack exceed the capability of a single-phase AC power branch circuit. For example, a single-phase AC branch circuit with two 10 AWG conductors can deliver about 208V×24 A=4992VA of power while a three-phase AC power branch circuit with three 10 AWG conductors can deliver about √3×208V×24 A=8646VA of power, almost twice the power of a single-phase circuit. For both types of branch circuits, the amount of power delivered will vary as the nominal voltage varies, but the ratio of delivered power between the single-phase and three-phase versions will remain the same.

When three-phase power is brought into a rack, it is divided up into three single-phase banks, where each single-phase bank is used to power a subset of the servers with single-phase power since servers generally require single-phase power inputs. When power redundancy is needed, two three-phase power sources are brought into each rack. Some users have installed standard three-phase to three-phase ATS units (FIGS. 1, 2) to switch from one three-phase source to another in event of a blackout or brownout. Three-phase to three-phase ATS units switch the 3 or 4 conductors of a primary three-phase line to those of a secondary three-phase line in the event of power drop or loss on one or more of the conductors. However, switching three-phase power (with the larger number of conductors and necessary synchronization of switching all 3 or 4 conductors at the same time) is much slower than switching single phase power, so the loads (e.g. servers) are experiencing a much longer energy gap in their power input. In some cases, switching of the three-phase to three-phase ATS is so "slow" (i.e., energy gap too long) that the loads are dropping. For simplicity, the term "load" is used to refer to the power consumed by one or a group of devices drawing power on the same single-phase branch of the three-phase power source.

Accordingly, various embodiments of the presently-disclosed three-phase to single-phase ATS combine, in a single unit, both a three-phase ATS that accepts dual three-phase AC input power sources as well as a distribution system that splits the three-phase AC input power into three single-phase AC output power branch circuits (including overcurrent protection devices). The single-phase AC output power branch circuits provide power to single-phase load devices connected to the ATS.

Figure 3:
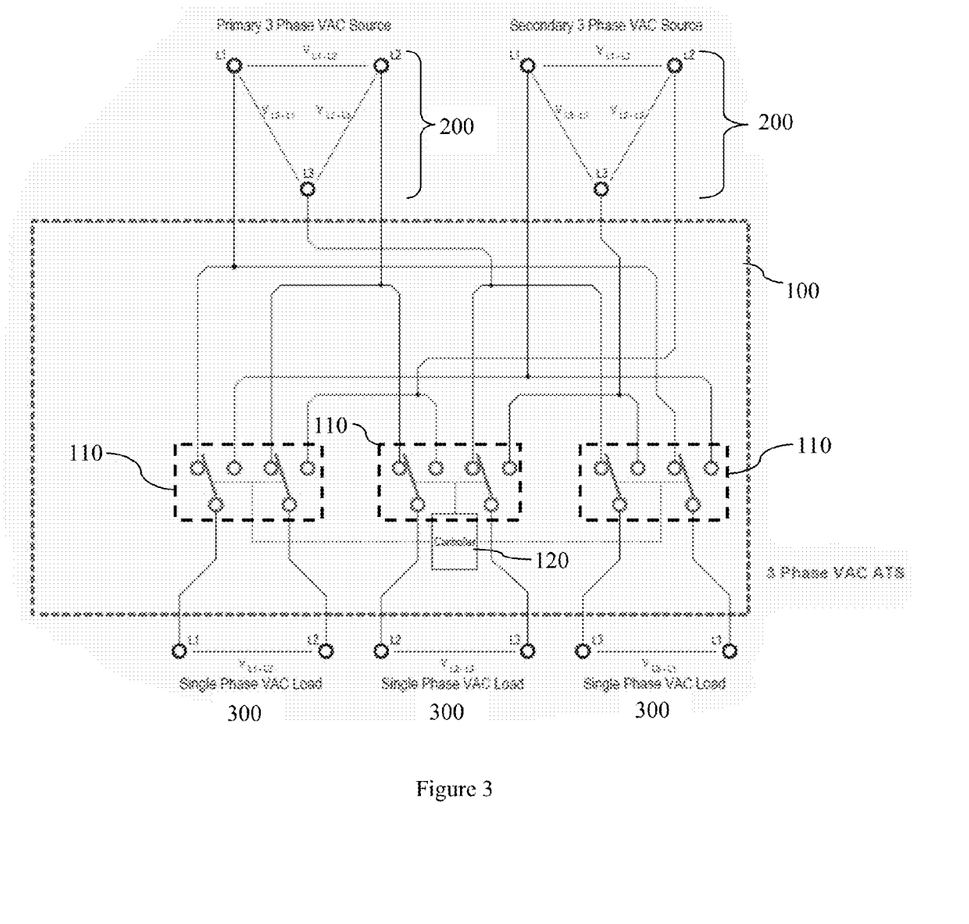
FIG. 3 shows an embodiment of the disclosed three-phase to single-phase ATS having a single controller unit for three-conductor three-phase power sources.
Figure 4:
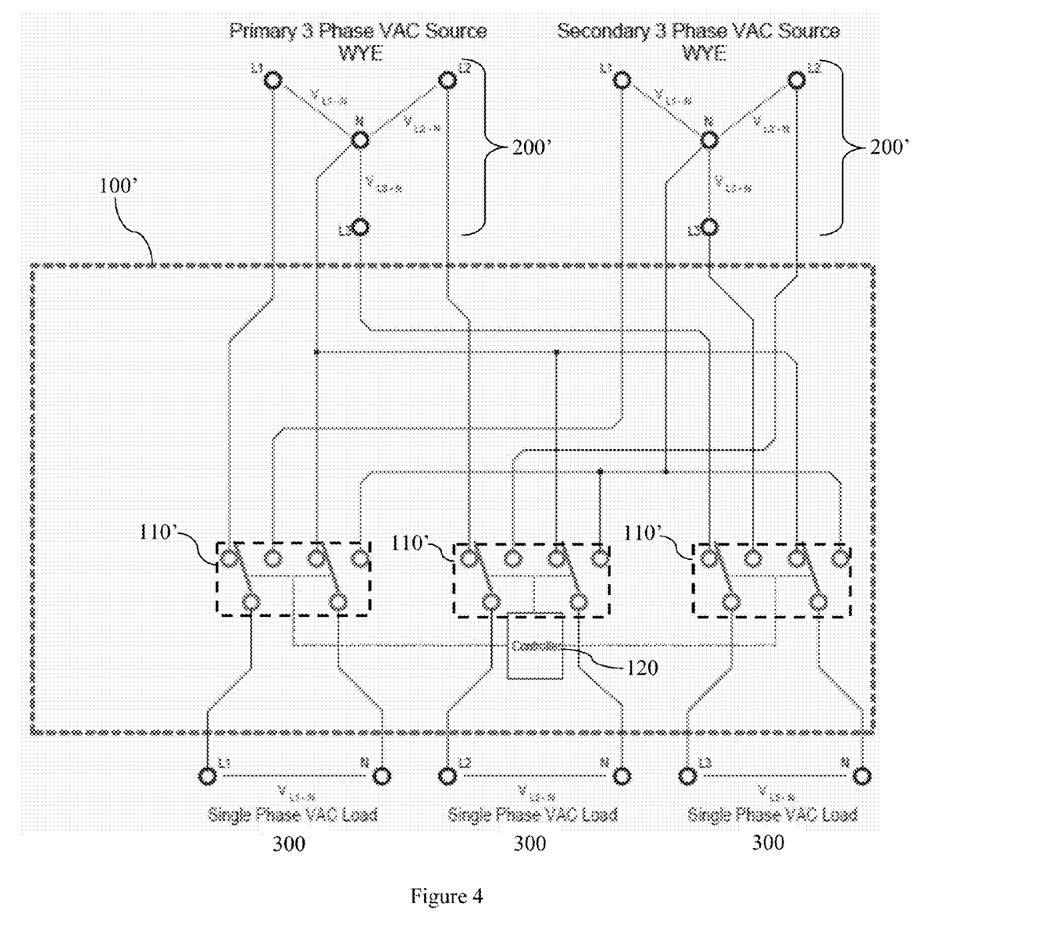
FIG. 4 shows an embodiment of the disclosed three-phase to single-phase ATS having a single controller unit for four-conductor three-phase power sources.

In various embodiments the invention provides a three-phase to single-phase ATS 100 having a plurality of independent, single-phase ATS modules 110 each connected to different pairs of conductors from two separate three-phase power sources 200 (FIGS. 3, 4). Each single-phase ATS module 110 includes a pair of switches, where each switch includes two input contacts, a toggle, and an output contact. The toggle is normally in contact with one or the other of the input contacts, except for brief periods when the toggle is in the process of switching from one contact to the other. On the other hand, the toggle is continuously connected to the output contact. Since the switches generally occur in pairs that function together (e.g. a double-pole switch), the input contacts, output contacts, and toggles are sometimes referred to as sets, for example a set of first input contacts, a set of second input contacts, a set of output contacts, and a set of toggles. In general, the term "switch" is used to describe any electromechanical or electronic device that can be controlled to connect or disconnect a power circuit. Nevertheless, where double-throw switches are shown or described, two single-throw switches may instead be used.

The three-phase to single-phase ATS 100 unit shown in FIG. 3 connects to two three-conductor, three-phase power sources 200 (primary and secondary) and powers three groups of single-phase devices (loads 300), using three single-phase ATS modules 110 to switch between the primary and the secondary sources 200. The three-phase to single-phase ATS 100' unit shown in FIG. 4 connects to two four-conductor, three-phase power sources 200' (primary and secondary) and powers three groups of single-phase devices (loads 300), using three single-phase ATS modules 110' to switch between the primary and the secondary sources 200'. In either configuration, subsets of the powered devices, such as servers in a rack (referred to as "loads" in FIGS. 3, 4), each receive single-phase power from one particular branch of the three-phase power supply (e.g. one of $V_{L1-L2}$, $V_{L2-L3}$, or $V_{L3-L1}$ in FIG. 3 or $V_{L1-N}$, $V_{L2-N}$, or $V_{L3-N}$ in FIG. 4). When power on one or more of the three conductors of the primary power source is lost (blackout) or degrades (i.e. experiences a loss of quality such as frequency shift, phase shift, and/or voltage decrease) (brownout), this is detected by at least one of the single-phase ATS modules inside the three-phase to single-phase ATS. The single-phase ATS module(s) that detect a decrease or loss of power initiate a switchover from the primary to the secondary source. Each single-phase ATS module switches to the backup secondary power source independently of the other modules, with the result that any given load (e.g. a server) will only experience a brief energy gap, namely the energy gap of a typical one-phase ATS of about 7-9 milliseconds, and thereby avoid a complete power loss.

In the presently-disclosed embodiments of a three-phase to single-phase ATS (FIGS. 3, 4), the switches are "break before make" in order to prevent shoot-through currents between the sources. Within the disclosed three-phase to single-phase ATS, there are three single-phase ATS modules, each of which has a pair of switches. The two switches within each single-phase module operate in unison. But each two-switch module operates independently of the other two-switch modules (e.g. in FIG. 3, the switches associated with $V_{L1-L2}$ open at the appropriate time but can close without having to coordinate with or wait for the switches associated with $V_{L2-L3}$ or $V_{L3-L1}$). Nevertheless, switch closures must be delayed long enough for arcing to extinguish (i.e. stop), in order to prevent shoot-through currents between the sources. With a three-phase power source, the three-phase voltage waveforms are staggered from each other by about 5-7 milliseconds (5.6 milliseconds for 60 Hz and 6.7 milliseconds for 50 Hz). However, as each switch pair switches a single-phase load, there is no additional delay needed for the other phases. Accordingly, since the 7-9 milliseconds typical "break before make" time of a switch pair is shorter than the 10-20 milliseconds load holdup time, there is no disruption to load operation with the presently-disclosed three-phase to single-phase ATS.

Various implementations of single-phase to single-phase ATS units use relays, others use solid state switches, and still others use a hybrid of both relays and solid state switches. Nevertheless, the disclosed three-phase to single-phase ATS system can be used with single-phase ATS modules having either relays or solid state switches, or a hybrid of both relays and solid state switches.

In general, most of the switching delay in an ATS is due to the "departure," namely the disconnection of the primary power source conductors. This is because ATS systems wait until a "zero crossing" point of the voltage on the particular conductor, i.e. the time when the sinusoidal voltage signal goes to zero. In a three-phase to three-phase ATS system, switching is not completed until all three conductors have been disconnected, so that on average the system must wait three times the typical departure time/zero crossing time of about 5-7 milliseconds for a single conductor, or about 15-21 milliseconds.

In a traditional three-phase ATS, since no load can be connected to one line on the primary source and one line from the secondary source, all of the conductors on the first power source have to be disconnected before a connection to any line on the second power source can be made. On the other hand, the presently-disclosed method switches each load individually instead of switching the entire three-phase load. Each load can move from the first power source to the second power source according to that load's own zero crossing on the departure side, in a manner independent of the other branches of the three-phase source. The presently-disclosed method is better in most scenarios, i.e. the energy gap seen by the loads is reduced in most cases compared to using a traditional three-phase ATS.

Figure 5:
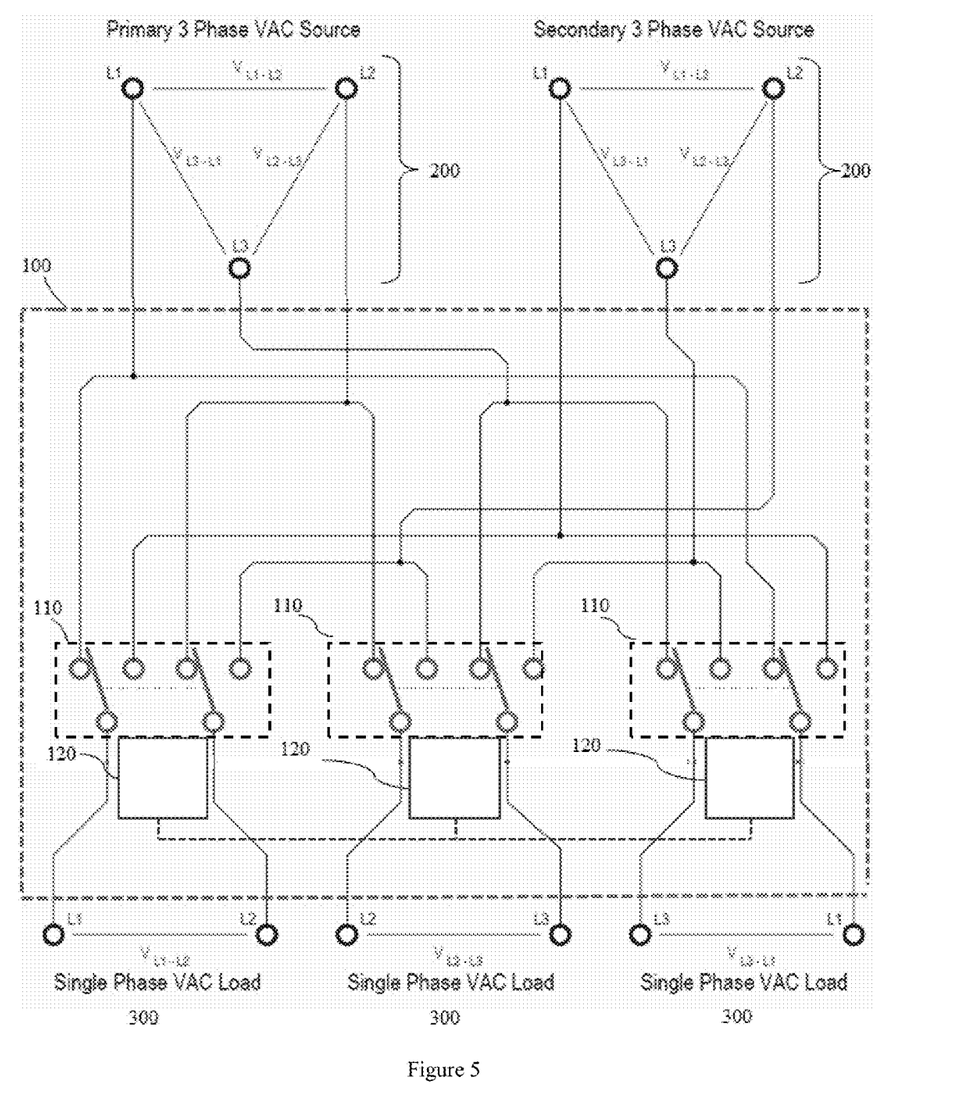
FIG. 5 shows an embodiment of the disclosed three-phase to single-phase ATS having three controller units for three-conductor three-phase power sources.
Figure 6:
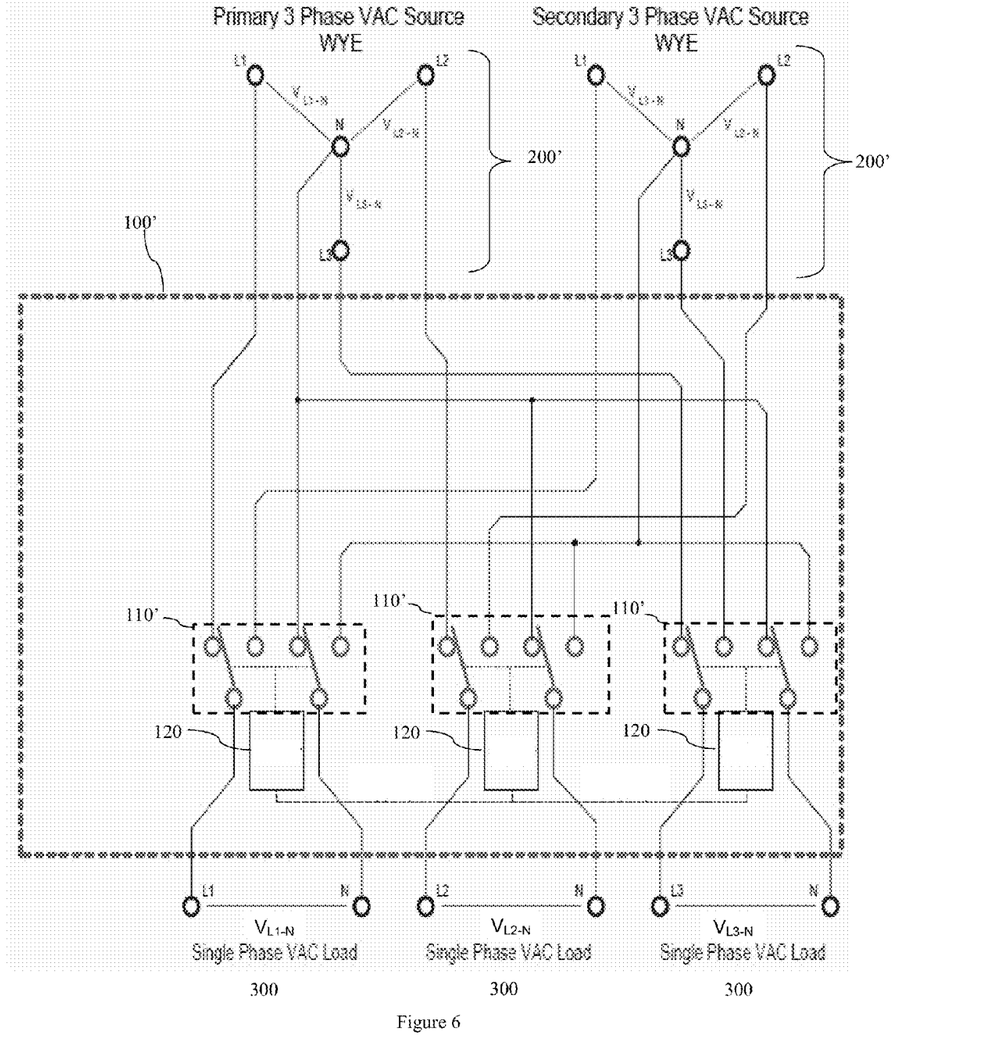
FIG. 6 shows an embodiment of the disclosed three-phase to single-phase ATS having three controller units for four-conductor three-phase power sources.

Although the individual single-phase ATS modules can operate independently of one another when switching from the primary to the secondary power source, in various embodiments the three-phase to single-phase ATS includes one or more controller(s) 120, 120' (FIGS. 3-6). Each individual ATS module 110, 110' may have its own controller (each of which may or may not communicate with the other controllers; FIGS. 5-6) and/or there may be a central controller for the three-phase to single-phase ATS 100, 100' (FIGS. 3-4). The central controller may or may not communicate with the single-phase ATS module controllers, if present. The controller(s) 110, 110' monitor power on each of the conductors L1, L2, L3 to detect blackout and brown-out conditions.

The provision of controller(s) that can communicate with the three pairs of transfer switches provides greater flexibility in the operation of the three phase ATS system. The controller(s) can be programmed to switch all of the single-phase ATS modules from primary to secondary power when at least one of the single-phase ATS modules detects a degradation or loss of power on one or more of the three-phase conductors of the primary power source. Alternatively, in the case where each switch pair includes a separate controller (e.g. as shown in FIGS. 5-6), the controllers may not be in communication with one another and instead each may operate independently of the other controllers. In this case the separate controllers monitor the power on the respective conductors of one or both of the three-phase sources and switch the respective switch pair based on the status of the power on the conductors.

The controller can also be programmed to monitor the primary power source and to restore connections from the secondary to the primary power source when power returns to all of the conductors of the primary power source. In various embodiments, operators of the disclosed three-phase to single-phase ATS units can control how the unit responds to power degradation or loss on one or more conductors of the three-phase power supply. For example, the operator can program the controller to automatically switch all three branches from the primary to the secondary power source when a power loss or degradation is detected on one or more conductors of the particular three-phase power source that is currently in use. In other embodiments, the operator can program the controller to wait for a defined period of time after power is restored to the primary power source before switching from the secondary to the primary power source. In still other embodiments, the operator can program the controller to switch from the primary to the secondary power source on a particular schedule (e.g. once a week).

As compared to other three-phase ATS units, the presently-disclosed three-phase to single-phase ATS has several advantages. For one, the presently-disclosed three-phase to single-phase ATS has a shorter average energy gap than the traditional three-phase ATS systems. In addition, in brown-out conditions, generator tests, or when switching a power source for non-failure reasons, the presently-disclosed three-phase to single-phase ATS displays little or virtually no energy gap, whereas traditional three-phase ATS units have relatively long energy gaps. In single-phase drop-out situations, the presently-disclosed ATS has a shorter energy gap than the traditional three-phase ATS system. Finally, the presently-disclosed ATS is equally advantageous for phase-to-phase or phase-to-neutral configurations.

The enhanced performance of the disclosed three-phase to single-phase ATS is achieved at least in part by controlling the energy gaps of three pairs of switching elements individually, instead of operating all three pairs of switching elements together in unison as in known three-phase to three-phase ATS units. This enhancement is possible due to the fact that the loads in a data center are typically single-phase loads. In contrast, known ATS units that are designed for use with three-phase power and three-phase loads are programmed to activate all three switching elements in unison, which requires a much longer energy gap (corresponding to a full cycle of 16 ms-20 ms) to avoid shoot-through currents from one three-phase AC input power source to the other three-phase AC input power source; shoot-through currents can damage equipment. In the presently-disclosed three-phase to single-phase ATS, pairs of switching elements are used to switch single-phase AC input power to individual single-phase loads or circuit branches, allowing the energy gap to be significantly reduced (less than a half cycle, typically 7 ms-9 ms). The reduced energy gap enhances performance by greatly reducing the likelihood of dropping the computer server loads.

As discussed above, embodiments of the disclosed three-phase to single-phase ATS units include one or more controllers that are configured to activate the switching elements appropriately. While controllers may be configured using analog circuits with discrete components or based on hardware implementations using digital logic circuits, in a preferred embodiment of the present system the controller is implemented with microcontroller-based circuits which include firmware to program the microcontroller. As shown in FIGS. 3-6, embodiments of the presently-disclosed three-phase to single-phase ATS 100, 100' may be controlled either with a single microcontroller 120 or with three microcontrollers 120. In those embodiments having three microcontrollers 120, the microcontrollers 120 may either act independently, or they may communicate with each other to coordinate some of their actions.

Controllers including microcontrollers programmed with firmware have several advantages relative to other controller implementations. For example, since their control function is contained in their firmware, microcontrollers can easily be field-modified to eliminate problems, enhance performance, and/or to provide additional features. In addition, microcontrollers can easily provide communication links to other devices or systems for system level control and management. Further, microcontrollers have precision clocks which allow them to accurately control the timing of the switching elements with respect to the AC input power waveforms. This assists in preventing shoot-through currents that can damage equipment or trip upstream overcurrent protection.

Since microcontrollers are programmable, the timing control signals can be modified for each individual unit during production line testing to offset the effects of component variations. This allows greater precision in controlling the energy gaps which can then be reduced, enhancing performance by reducing the likelihood of dropping computer server loads.

Whether an ATS has a single microcontroller or three microcontrollers that communicate with each other, the microcontrollers can be programmed so that the ATS coordinates the actions on all three single-phase AC output power circuits. Assuring that all three pairs of switching elements have the same state may be a desirable feature, particularly in various fault modes. One example occurs when the AC input voltage is lost on one phase conductor but is still present on the other phase conductors. In this example, it may be desirable to cause all three pairs of switching elements to select the same three-phase AC input power source, as discussed above.

In some embodiments the three-phase to single-phase ATS unit uses hybrid solid-state/relay switching elements. Each hybrid switch element includes a solid-state switching device and a relay in parallel. The solid-state switching devices absorb the transient voltage and current switching stresses (preventing wear-out of the relay contacts) while the relays will provide the continuous duty power path (reducing continuous power dissipation associated with solid-state switching elements). This is accomplished by having initial switching performed by the solid-state devices and, after a small delay of 2-3 ms (minimum), switching the relays.

The advantages of using hybrid solid-state/relay switching elements include: (a) improved reliability due to elimination of the relay contact wear-out mechanism; (b) improved performance due to the smaller energy gaps achievable with faster solid-state switching; and (c) higher ATS power capability due to the higher currents that the relays can carry since they no longer have to handle the transient switching stresses.

Figure 7:
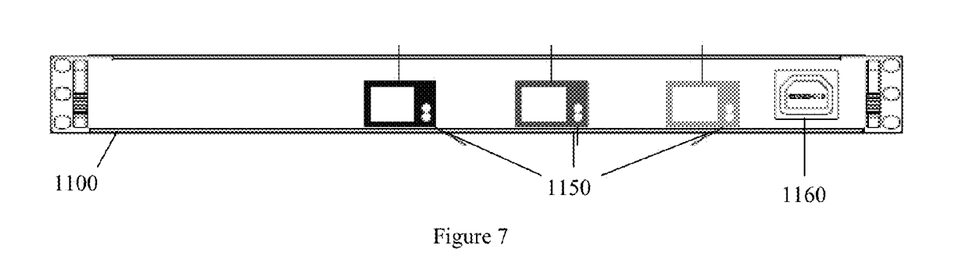
FIG. 7 shows a front view of an embodiment of the disclosed three-phase to single-phase ATS.
Figure 8:
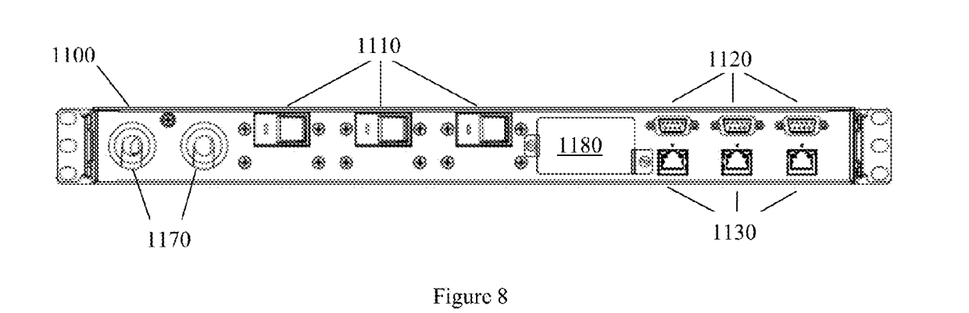
FIG. 8 shows a rear view of an embodiment of the disclosed three-phase to single-phase ATS.
Figure 11:
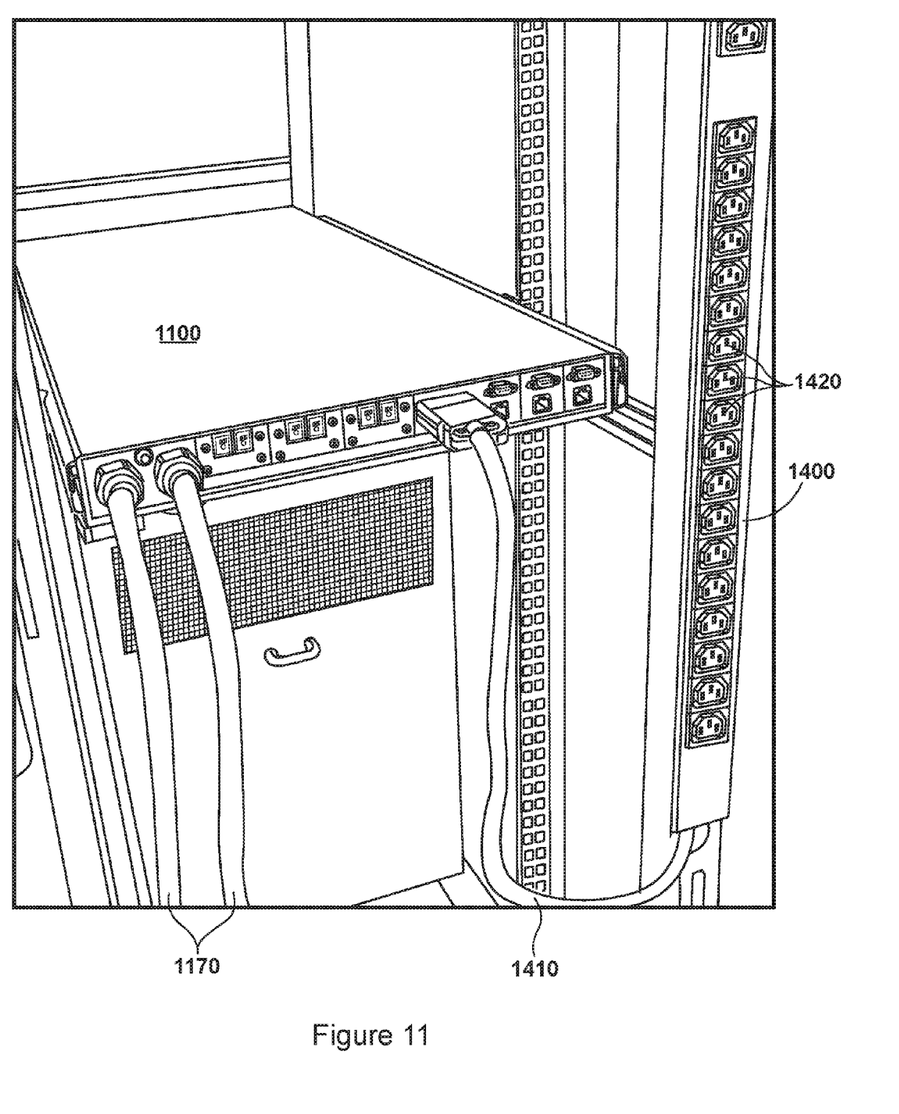
FIG. 11 shows a rear view of an embodiment of the disclosed three-phase to single-phase ATS mounted on an equipment rack along with a vertically-mounted power strip.

FIGS. 7-11 depict an embodiment of a three-phase to single-phase ATS unit 1100. FIG. 7 shows a front view of a three-phase to single-phase ATS 1100 and FIG. 8 shows a rear view. FIG. 11 shows a perspective view from the rear of a three-phase to single-phase ATS unit 1100 mounted on an equipment rack along with a vertically-mounted power strip 1400. In the embodiment shown in FIG. 7, the front of the ATS unit 1100 includes indicators 1150 for each of the three branch circuits (L1-L2, L2-L3, L3-L1), each of which shows, for example, a digital readout of the load (e.g. in Amps) and an indicator (e.g. labeled LED lights) showing whether the particular branch circuit is connected to the primary or the secondary power source. In some embodiments the front of the ATS unit 1100 may also include a receptacle 1160 which delivers power from one of the branch circuits.

In various embodiments, the rear of the ATS unit 1100 (FIGS. 8, 11) includes two power cords 1170 for connecting to the primary and secondary power sources, respectively, as well as a receptacle 1180 to which a specialized power strip 1400 (described below) may be connected. Also included are three circuit breakers 1110 (one for each single phase output load), one to three Ethernet network ports 1130, and one to three serial ports 1120. The network ports 1130 are used to communicate ATS status to data center management systems. The serial ports 1120 are used to set configuration data within the ATS unit 1100 (such as static FP addresses). In certain embodiments, the ATS unit 1100 delivers power from the three conductors L1, L2, L3, which deliver input power from either the primary or the secondary power source, to the receptacle 1180. Wiring inside the ATS 1100 distributes power to three single-phase branch circuits (L1-L2, L2-L3, or L3-L1) derived from the three-phase power source(s) to receptacle 1180. Receptacle 1180 in turn connects to an input cable of a power strip, as described below.

Figure 9:
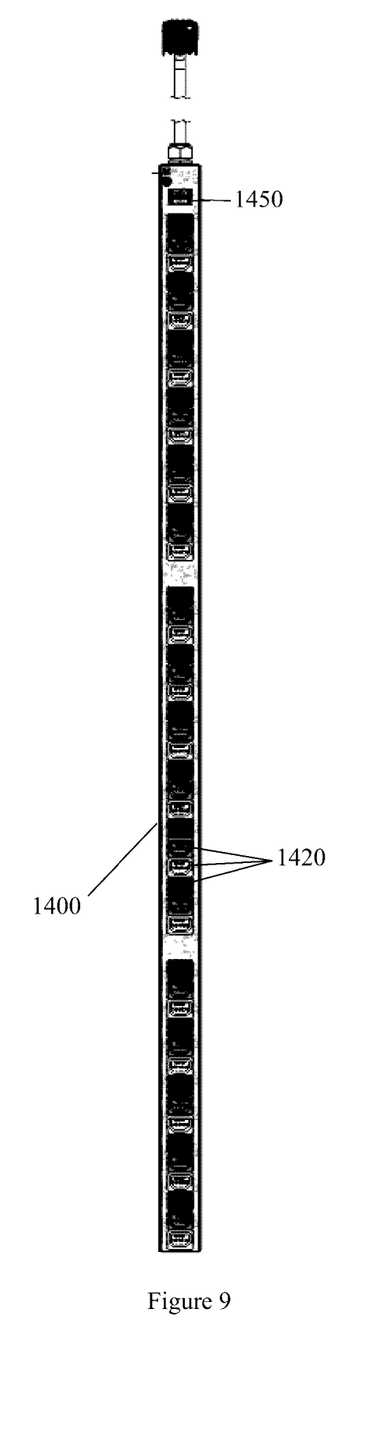
FIG. 9 shows a top view of an embodiment of a power strip for use with the disclosed three-phase to single-phase ATS.
Figure 10:
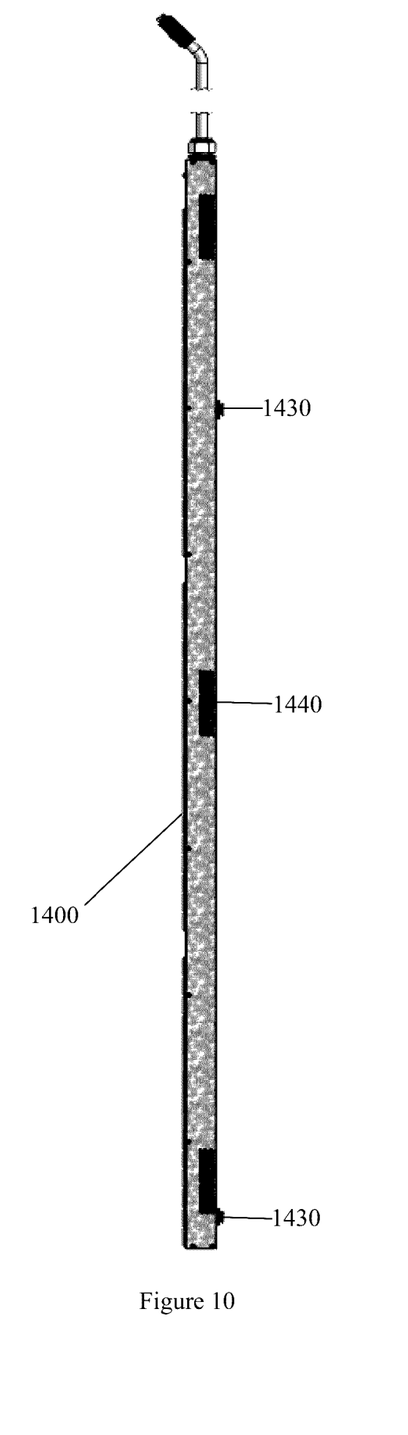
FIG. 10 shows a side view of an embodiment of a power strip for use with the disclosed three-phase to single-phase ATS.

FIGS. 9 and 10 show front and side views, respectively, of a power strip 1400 for use with the disclosed three-phase to single-phase ATS 1100, where the power strip 1400 includes an input cable 1410 which connects to the receptacle 1180. FIG. 11 includes a perspective view of the power strip 1400 mounted to an equipment rack, the power strip 1400 including a number of receptacles 1420 which deliver single-phase power. As noted above, wiring inside the ATS 1100 distributes power to three single-phase branch circuits derived from the three-phase power source(s) to the output connector, receptacle 1180. Each single-phase branch circuit is connected to a number (e.g. one-third) of the receptacles in the power strip.

In various embodiments, the receptacles 1420 are staggered so that every third receptacle 1420 along the length of the strip 1400 receives power from the same single phase branch circuit derived from the three-phase power supply(ies). In some embodiments the receptacles 1420 are color-coded, e.g. using white, gray, or black material, to indicate the branch to which a given receptacle 1420 corresponds. The rear of the power strip 1400 (e.g. right side in FIG. 10) may include suitable hardware 1430 or mounting features to mount the power strip 1400 onto an equipment rack. The sides of the power strip 1400 (FIG. 10) may include openings 1440 for ventilation. The power strip 1400 may be made in various lengths with varying numbers of single-phase receptacles 1420 (typically in multiples of three); in the particular embodiment shown in FIG. 9 there are 51 single-phase receptacles 1420, made up of 17 groups of 3 receptacles.

Various features and advantages of the invention are set forth in the following claims.

What is claimed is:

1. A three phase to single phase automatic transfer switch for providing power to at least one single phase power load from one of a primary and a secondary source of three phase power, the automatic transfer switch comprising:
    a. three pairs of switches, wherein each pair of switches is connectable to the primary and the secondary sources of three phase power, wherein each switch operates in unison with the other switch within its pair, wherein each pair of switches is connectable to a different one of the at least one single phase power load, and wherein each pair of switches is operable independently of the other pairs of switches; and
    b. one or more controller in communication with each of the pairs of switches, the controller configured so that, when power from the primary source of three phase power is lost or degraded, the controller connects each pair of switches independently of each of the other pairs of switches from the primary to the secondary source of three phase power.

2. The three phase to single phase automatic transfer switch of claim 1, wherein the controller is configured to disconnect each of the pairs of switches from the primary source of three phase power independently from the other pairs of switches.

3. The three phase to single phase automatic transfer switch of claim 2, wherein, following disconnection of each of the pairs of switches from the primary source of three phase power, the controller is configured to delay reconnection of each of the pairs of switches to the secondary source of three phase power long enough to extinguish arcing.

4. The three phase to single phase automatic transfer switch of claim 3, wherein reconnection of each of the pairs of switches to the secondary source of three phase power is independent of the reconnection of the other pairs of switches to the secondary source of three phase power.

5. The three phase to single phase automatic transfer switch of claim 3, wherein a period of time from the disconnection of a pair of switches from the primary source of three phase power to the secondary source of three phase power comprises an energy gap, and wherein the controller is programmed so that the energy gap for a pair of switches is less than 10 milliseconds.

6. The three phase to single phase automatic transfer switch of claim 1, wherein the pairs of switches comprise hybrid solid-state/relay switches.

7. The three phase to single phase automatic transfer switch of claim 1, wherein the controller comprises a microcontroller and wherein the microcontroller is configured by programming the microcontroller.

8. A three phase to single phase automatic transfer switch for providing power from one of two alternative three phase power sources to single phase power loads, each of the three phase power sources having at least three conductors, the automatic transfer switch comprising:
    a. three pairs of switches all connectable to either one of the two alternative three phase power sources, each switch operable in unison with the other switch within its pair, each pair of switches connectable to a different single phase load and operable independently of the other pairs of switches;
    b. each of the switches having two input contacts and a toggle, the toggle normally connected to one of the input contacts, each input contact within a switch connectable to a conductor of one of the two alternative three phase power sources and the other input contact within a switch connectable to a conductor of the other of the two alternative three phase power sources and the toggle being connectable to at least one of the single phase power loads; and
    c. one or more controller communicating with the pairs of switches, the controller configured so that when power from a connected one of the two alternative three phase power sources is lost or degrades, the controller simultaneously flips the toggles in each switch pair from the connected to the previously unconnected contact independently of the other pairs of switches such that power is drawn from the other of the two alternative three phase power sources.

9. The three phase to single phase automatic transfer switch of claim 8, wherein the controller comprises a microcontroller and wherein the microcontroller is configured by programming the microcontroller.

10. The three phase to single phase automatic transfer switch of claim 8, wherein the controller comprises at least one of an analog circuit having discrete components and a digital logic circuit.

11. The three phase to single phase automatic transfer switch of claim 8, wherein the pairs of switches comprise double throw switches.

12. The three phase to single phase automatic transfer switch of claim 8, further comprising three controllers, wherein each controller is in communication with a respective pair of switches, and wherein the controllers are not in communication with one another.

13. A method of switching between a primary and a secondary three-phase power source, each of the primary and secondary three-phase power sources including at least three conductors, the method comprising the steps of:
    providing three pairs of switches, each pair of switches including a set of first contacts, a set of second contacts, and a set of toggles, wherein each of the toggles is normally connected to a first contact and is switchable between the first contact and a second contact;
    connecting the set of first contacts of each pair of switches to the primary three-phase power source;
    connecting the set of second contacts of each pair of switches to the secondary three-phase power source;
    connecting the set of toggles of at least one pair of the three pairs of switches to a single-phase load;
    monitoring power on the conductors of the primary three-phase power source; and
    if the power on at least one of the conductors of the primary power source is lost or degraded, switching the set of toggles of at least one of the pairs of switches from the set of first contacts to the set of second contacts.

14. The method of claim 13, wherein switching the set of toggles of at least one of the pairs of switches from the set of first contacts to the set of second contacts comprises disconnecting the set of toggles from the set of first contacts, waiting for a delay sufficient to extinguish arcing, and connecting the set of toggles to the set of second contacts.

15. The method of claim 14, wherein connecting the set of toggles to the set of second contacts is performed independently for each of the pairs of switches.

16. The method of claim 13, wherein the pairs of switches comprise hybrid solid-state/relay switches.

17. The method of claim 13, wherein the pairs of switches comprise double throw switches.

* * * * *